(12) United States Patent
Ruzek

(10) Patent No.: US 12,553,110 B2
(45) Date of Patent: Feb. 17, 2026

(54) METHOD FOR GRAIN REFINEMENT OF A BERYLLIUM ARTICLE

(71) Applicant: Materion Corporation, Mayfield Heights, OH (US)

(72) Inventor: Andrew Ruzek, Mayfield Heights, OH (US)

(73) Assignee: Materion Corporation, Mayfield Heights, OH (US)

( * ) Notice: Subject to any disclaimer, the term of this patent is extended or adjusted under 35 U.S.C. 154(b) by 348 days.

(21) Appl. No.: 18/462,711

(22) Filed: Sep. 7, 2023

(65) Prior Publication Data

US 2024/0076762 A1    Mar. 7, 2024

Related U.S. Application Data

(60) Provisional application No. 63/404,362, filed on Sep. 7, 2022.

(51) Int. Cl.
*C22C 1/04*      (2023.01)
*C21D 9/00*      (2006.01)
*C22C 25/00*     (2006.01)

(52) U.S. Cl.
CPC .............. *C22C 1/0408* (2013.01); *C21D 9/00* (2013.01); *C22C 25/00* (2013.01); *C21D 2201/05* (2013.01)

(58) Field of Classification Search
CPC .......... C22C 25/00; C22C 1/0408; C21D 9/00
See application file for complete search history.

(56) References Cited

U.S. PATENT DOCUMENTS

| | | | |
|---|---|---|---|
| 3,379,521 A | 4/1968 | Butcher | |
| 3,685,988 A * | 8/1972 | Frenkel et al. | G21C 3/07 420/401 |
| 4,786,469 A | 11/1988 | Weber et al. | |
| 10,500,639 B2 | 12/2019 | Yurko | |
| 2024/0051023 A1 | 2/2024 | Ruzek | |
| 2024/0100599 A1 | 3/2024 | Ruzek | |
| 2024/0101439 A1 | 3/2024 | Ruzek | |

OTHER PUBLICATIONS

Obilanade, et al., "Spacecraft Designers' Guide to Using Additive Manufacturing Processes for Large Metallic Spacecraft Structures", 68th International Astronautical Congress (IAC), Adelaide, Australia, Sep. 2017, pp. 1-25 Retrieved from the Internet: URL:https://www.diva-portal.org/smash/get/diva2:1607656/FULLTEXT01.pdf XP093105649.

Harkness et al., "Metallographic Techniques for Beryllium Copper and Beryllium Nickel Alloys," Materion Corp, Mar. 25, 2014, pp. 1-12.

* cited by examiner

*Primary Examiner* — Jessee R Roe
(74) *Attorney, Agent, or Firm* — COZEN O'CONNOR

(57) ABSTRACT

Methods for grain refinement of beryllium articles are disclosed. Grain refinement allows the beryllium article to have beneficial properties in terms of strength and durability. One method stabilizes the β-phase of the beryllium that is precipitated after cycling above a temperature that is greater than or equal to the beta transus temperature.

20 Claims, 2 Drawing Sheets

METHOD FOR GRAIN REFINEMENT OF A BERYLLIUM ARTICLE

CROSS REFERENCE TO RELATED APPLICATIONS

This application claims priority to U.S. Provisional Application No. 63/404,362, filed Sep. 7, 2022, which is fully incorporated by reference herein.

TECHNICAL FIELD

The present disclosure relates to a method for producing a beryllium article. In particular the method produces beryllium articles that have β-phase grain structure with reduced columnar grain structure. The increased β-phase grain structure leads to improved strength and processing.

BACKGROUND

Beryllium is a metal with highly desirable properties. These include high stiffness (Young's modulus=287 GPa), low density (1.85 g/cc), a high elastic modulus (130 GPa), high specific heat (1925 J/kg·K), high thermal conductivity (216 W/m·K), and a low coefficient of linear thermal expansion ($11.4 \times 10^6/°$ K). As a result, beryllium and its composites are useful in airborne and spaceborne structures, high-performance engines and brakes, and electronic components for thermal performance and vibration damping. Beryllium and its composites are also useful in several different applications, including combustion applications, hypersonic vehicles, computer parts, optics for space- and ground-based systems, satellite structures, solar energy collectors, and nuclear energy growth applications.

One limitation is that casting methods are unsuitable for manufacturing a beryllium product, and lead to columnar solidification. Beryllium is a highly reactive metal with a high melting point, making it susceptible to reaction with mold-wall materials to form beryllium compounds (BeO, etc.) that become entrapped in the solidified metal. In addition, the grain size is greater than 500 microns and typically much higher up to 50,000 microns. This is far too large to meet strength requirements and results in a brittle material. Further attempts to refine grains through mechanical working have not met with commercial success. To overcome the beryllium production problem, beryllium powder has been used. Beryllium powder can be formed by ball milling, disk grinding, or gas atomizing process. The powder is consolidated into ingots that can be further processed into shaped components of beryllium. This process requires careful handling of the beryllium powder. In addition, the powder process has low material utilization that leads to inefficiencies and increased costs. The powder process is also limited in forming complex shapes.

Objects built by depositing layers may allow for complex shapes but still suffer from poor crystalline structures due to a lack of plastic deformation from mechanical forming. As the layers are built in one direction the solidification tends to result in poor microstructure and columnar grains are prevalent. Undesirable reductions in mechanical properties result in a loss of strength and durability.

There still remains a need to eliminate columnar solidification for producing beryllium articles having reduced grain size in an efficient manner.

SUMMARY

The present disclosure relates to methods for making beryllium articles. In one embodiment, there is provided a method for grain refinement of beryllium in an efficient manner that achieves improvements in terms of strength and durability. In one embodiment, the methods disclosed herein provide for efficient grain refinement that precipitates the β-phase grain of beryllium by including a stabilizer.

In one embodiment, there is provided a method of grain refining a beryllium-based article, the method comprising combining beryllium and at least one stabilizer comprising at least one metal being selected from the group consisting of cobalt, copper, nickel, and iron to form a pre-alloy composition, depositing a layer comprising the pre-alloy composition on a surface, cycling at least a portion of the layer above a temperature that is greater than or equal to beta transus temperature, preferably from 1050° C. to 1250° C., of the pre-alloy composition, precipitating a β-phase of the beryllium in the layer, and repeating the depositing/cycling/precipitating for one or more successive layers, wherein each of the successive layers comprises the pre-alloy composition. In one embodiment, the beryllium-based article has an average grain size from 1 to 80 microns. In one embodiment, based on the total beryllium in the beryllium-based article the beryllium-based article may comprise from 1 at. % to 99 at. % of β-phase species, and more preferably from 10 at. % to 60 at. %. In one embodiment, the pre-alloy composition comprises from 40 to 95% by weight of beryllium and from 5 to 60% by weight of the at least one stabilizer. The pre-alloy composition may be in the form of particles and the particles may have a D50 average size from 10 to 50 microns. The cycling may involve exposing each deposited layer to an energy source followed by cooling.

In one embodiment, there is provided a method of grain refining a beryllium-based article, the method comprising depositing a layer on a surface, the layer comprising a pre-alloy composition comprising beryllium and at least one stabilizer comprising at least one metal being selected from the group consisting of cobalt, copper, nickel, and iron, cycling at least a portion of the layer above a temperature that is greater than or equal to the beta transus temperature of the pre-alloy composition, precipitating a β-phase of the beryllium in the layer, and repeating the depositing/cycling/precipitating for one or more successive layers, wherein each of the successive layers comprises the pre-alloy composition, and the beryllium-based article has an average grain size from 1 to 80 microns. In one embodiment, the beryllium-based article may comprise from 1 at. % to 99 at. % of β-phase species based on the total beryllium in the beryllium-based article.

In one embodiment, there is a provided a beryllium-based article comprising beryllium and at least one stabilizer comprising at least one metal being selected from the group consisting of cobalt, copper, nickel, and iron, wherein the beryllium-based article has an average grain size from 1 to 80 microns, and wherein the beryllium-based article comprises from 1 at. % to 99 at. % of β-phase species based on the total beryllium in the beryllium-based article.

In one embodiment, there is a provided a beryllium-based article comprising beryllium and at least one stabilizer comprising at least one metal being selected from the group consisting of cobalt, copper, nickel, and iron, wherein the beryllium-based article has an average grain size from 1 to 80 microns, and wherein the beryllium-based article comprises from 1 at. % to 99 at. % of β-phase species based on the total beryllium in the beryllium-based article, produced by combining beryllium and at least one stabilizer comprising at least one metal being selected from the group consisting of cobalt, copper, nickel, and iron to form a pre-alloy composition; depositing a layer comprising the pre-alloy composition on a surface; cycling at least a portion of the layer above a temperature that is greater than or equal to the beta transus temperature of the pre-alloy composition; precipitating a β-phase of the beryllium in the layer; and repeating the depositing/cycling/precipitating for one or more successive layers.

These and other non-limiting characteristics are more particularly described below.

BRIEF DESCRIPTION OF THE DRAWINGS

A further understanding of the nature and advantages of the disclosed technology may be realized by reference to the remaining portions of the specification and the drawings.

DETAILED DESCRIPTION

Figure 1:
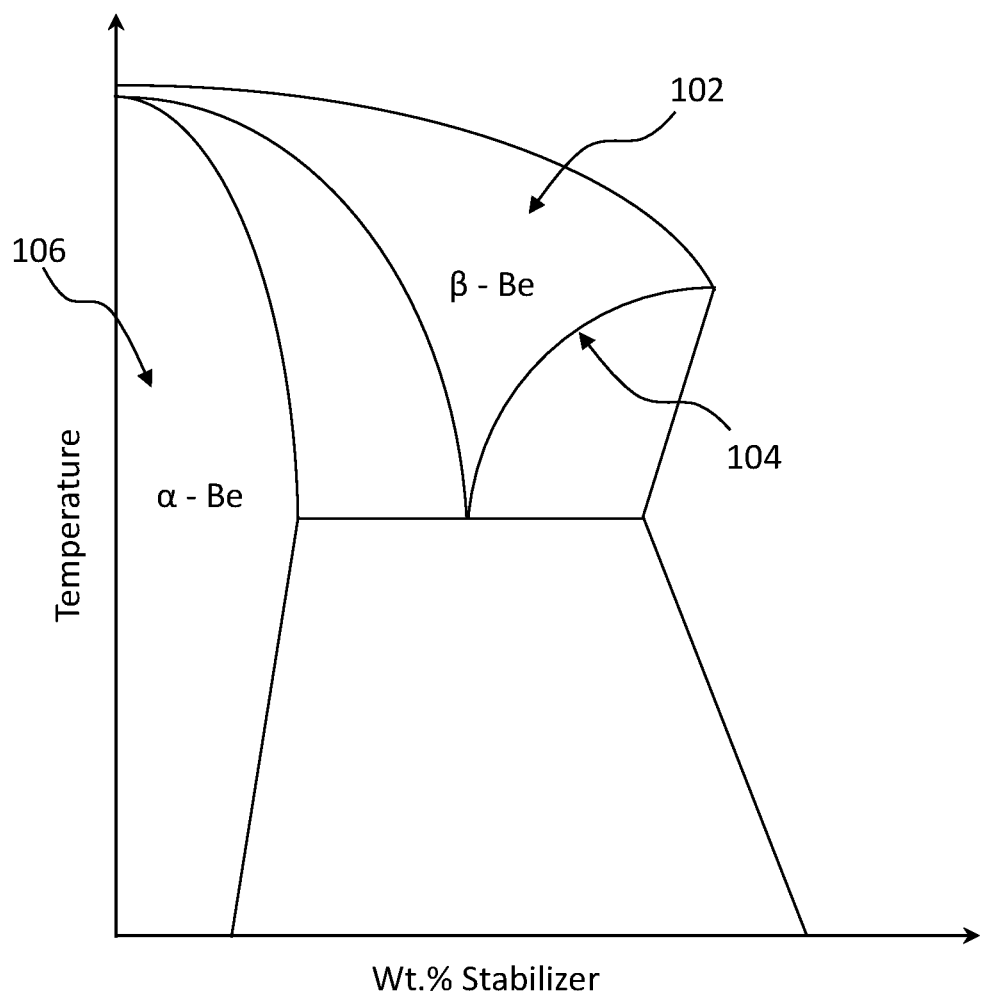
FIG. 1 is a phase diagram for a beryllium-based article having a metal stabilizer in accordance with an embodiment disclosed herein.

The present disclosure may be understood more readily by reference to the following detailed description of desired embodiments and the examples included therein. In the following specification and the claims which follow, reference will be made to a number of terms which shall be defined to have the following meanings.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions or methods as "consisting of" and "consisting essentially of" the enumerated ingredients/steps, which allows the presence of only the named ingredients/steps, along with any impurities that might result therefrom, and excludes other ingredients/steps.

Numerical values in the specification and claims of this application, as they relate to polymers or polymer compositions, reflect average values for a composition that may contain individual polymers of different characteristics. The numerical values disclosed herein should be understood to include numerical values which are the same when reduced to the same number of significant FIGURES and numerical values which differ from the stated value by less than the experimental error of conventional measurement technique of the type described in the present application to determine the value.

All ranges disclosed herein are inclusive of the recited endpoint and independently combinable (for example, the range of "from 1 micron to 40 microns" is inclusive of the endpoints, 1 micron and 40 microns, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

As described herein, there is a method for producing a beryllium article. The beryllium article may contain a stabilizer that is used to promote the precipitation of β-phase grain. The mixture of beryllium and stabilizer is cycled through heating and cooling to produce a grain structure that has an increased amount of β-phase grain. In one embodiment, the mixture of beryllium and stabilizer may be rapidly cycled through heating and cooling to produce a grain structure that has an increased amount of β-phase grain. In one embodiment, the grain structure of the beryllium article may have equiaxed-grains after the cycling. Without being bound by theory, the presence of β-phase grain is shown to contribute to the grain refinement of the beryllium article. The grain refinement of beryllium-based articles can lead to improved strength and processing when forming an article with a series of layers. In one embodiment, the beryllium article may have an average grain size from 1 to 80 microns, e.g., from 1 to 75 microns, from 1 to 60 microns, from 1 to 50 microns, from 1 to 40 microns, from 5 to 40 microns, from 5 to 25 microns, from 5 to 15 microns, or from 10 to 15 microns. In one embodiment, a portion of the grains of the beryllium article may have an aspect ratio of less than 3:1. In particular, 75% of the grains of the beryllium article may have an aspect ratio of less than 3:1, e.g., less than 2.5:1 or less than 2:1. Average grain size and aspect ratio may be determined using optical imaging, such as SEM imaging, and by using the comparison, planimetric, or intercept parameters of ASTM E 112-12. Grain refinement improves the mechanical properties of the beryllium-based article.

In one embodiment, the beryllium-article is enriched in β-phase species. Stabilizing the β-phase species may improve the strength and lower the cost of producing beryllium-articles. Having a volume of β-phase species allows the production of a beryllium-article having a controllable grain refinement. In one embodiment, based on the total beryllium in the beryllium-based article the beryllium-article comprises from 1 at. % to 99 at. % of β-phase species, e.g., from 5 at. % to 90 at. %, from 10 at. % to 90 at. %, from 10 at. % to 75 at. %, from 10 at. % to 60 at. %, from 20 at.

% to 60 at. %, or from 25 at. % to 50 at. %. The quantification of the β-phase species may be done using microscopy techniques, such as x-ray diffraction analysis. In addition, the physical characteristics of the beryllium-article may show a strong correlation to the presence of β-phase species.

In one embodiment, the stabilizers that are combined with beryllium include metals that stabilize the β-phase species of beryllium. The stabilizers, when combined with beryllium, form a pre-alloy composition. In one embodiment, the stabilizers are an eutectoid type beta stable element. The stabilizers may be present as a loose powder, a paste, or a suspension that may be combined with beryllium. In one embodiment, the metal remains unreacted when combined with beryllium. There are several ways to combine the stabilizers and beryllium, such as mixing, blending, atomization, mechanical alloying, resonant mixing, or combinations thereof. Resonant mixing is useful when the blend of the beryllium and stabilizer have a different size to achieve a thoroughly mix. In one embodiment, resonant mixing induces non-contact acoustic mixing with acoustic waves in the frequency from 20 to 80 Hz to achieve good mixing in a short time without inducing fractures or stress to the beryllium and stabilizer. Accordingly, a single stabilizer may be combined with the beryllium to achieve the β-phase grain, while in some embodiments, there may be a mixture of stabilizers. In one embodiment, the stabilizers comprise cobalt, copper, nickel, iron, and combinations thereof. A preferred embodiment may combine cobalt and/or copper with beryllium to form a pre-alloy composition.

In one embodiment, the combining step may be optional and the pre-alloy composition comprising beryllium and the at least one stabilizer is deposited as a layer. Accordingly, there is provided a method of producing a beryllium article comprising depositing a layer comprising a pre-alloy composition of beryllium and at least one stabilizer comprising at least one metal being selected from the group consisting of cobalt, copper, nickel, and iron on a surface, cycling at least a portion of the layer above a temperature that is greater than or equal to the beta transus temperature of the pre-alloy composition, precipitating a β-phase of the beryllium in the layer, and repeating the depositing/cycling/precipitating for one or more successive layers, wherein each of the successive layers comprises the pre-alloy composition and the beryllium-based article has an average grain size from 1 to 80 microns.

FIG. 1 is a phase diagram showing an exemplary β-phase region 102 of the beryllium as a result of temperature and the addition of a metal stabilizer, such as cobalt, copper, nickel, iron, and combinations thereof. The beta transus temperature line 104 is shown and during the process the cycling above this temperature forms the β-phase of beryllium. The α-phase region 106, Without the metal stabilizer beryllium is near α-phase that has low β-phase which is unable to obtain the grain refinement.

In one embodiment, the stabilizer may be a metal powder. The metal powder may have an aspect ratio (mean length to mean width) from 1:1 to 100:1, e.g., from 1:1 to 50:1, from 1:1 to 20:1, from 1:1 to 10:1 or from 1:1 to 5:1. The metal powder may be smaller than the beryllium powder. The metal powder may have an average ($D_{50}$) particle size of less than 10 microns, e.g., less than 8 microns, less than 5 microns, less than 2.5 microns, less than 2 microns or less than 1 micron. In some embodiments, the metal powder may have an average ($D_{50}$) that is a nanoparticle, e.g., less than 1 micron. In some embodiments, the nanoparticles may have an average ($D_{50}$) that is from 10 to 1000 nanometers, e.g., 25 to 950 nanometers, 50 to 900 nanometers, 100 to 800 nanometers, or from 300 to 700 nanometers. Accordingly, the metal powder may have an average ($D_{50}$) particle size from 0.0001 to 10 microns, e.g., from 0.0005 to 7.5 microns, from 0.001 to 5 microns, from 0.01 to 2.5 microns, or from 0.1 to 1.5 microns. The metal powders having a suitable size are effective in stabilizing the β-phase of beryllium.

In one embodiment, the pre-alloy composition may comprise beryllium in an amount from 40 to 95% by weight, based on the total weight of the pre-alloy composition. More preferably, the pre-alloy composition may comprise beryllium in an amount from 50 to 85% by weight, e.g. from 55 to 80% by weight or from 60 to 75% by weight.

In one embodiment, the beryllium includes beryllium powder. Exemplary beryllium metals include S-65 grade (99.2% minimum Be content, 0.9% max BeO), S-200 (98.5% minimum Be content), 0-30 (Hot Isostatically Pressed beryllium, minimum 99% Be content, 0.5% max BeO), and, all available from Materion Corporation. The beryllium powder may have an aspect ratio (mean length to mean width) from 1:1 to 100:1, e.g., from 1:1 to 50:1, from 1:1 to 20:1, from 1:1 to 10:1 or from 1:1 to 5:1. In one embodiment, the beryllium powder may be a spherical shape. The beryllium powder may have an average ($D_{50}$) particle size of from 1 micron to 200 microns, e.g., from 5 microns to 175 microns, from 10 microns to 150 microns, from 15 microns to 100 microns, from 25 microns to 70 microns or from 25 microns to 50 microns. The particle size is the $D_{50}$, or the diameter at which a cumulative percentage of 50% of the particles by volume is attained. Powders that are smaller than 200 microns may be constructively used to form beryllium articles with reduced grain refinement. When needed, the beryllium powder may be sieved to achieved a desired size.

In one embodiment, the beryllium powder may be in the form of particles having a core-shell structure, with the beryllium making up the core and a continuous or a semi-continuous coating making up the shell. In some embodiments, the continuous or a semi-continuous coating may be include a stabilizer. Coating the beryllium may be achieved by ball milling, resonance mixing, spray binding, spray drying, laser ablation, electrical-discharge machining, and atomic layer deposition. In some embodiments, the coating includes nickel, either pure nickel or in the form of a nickel alloy. The core may be from 0.1 wt % to 99.9 wt % of the particles, or from 50 wt % to 99.9 wt %, or from about 92 wt % to less than 100 wt % of the particles. In some embodiments, the coating may be from 0.1 wt % to 99.9 wt % of the particles, or from 0.1 wt % to 50 wt %, or from greater than zero wt % to about 8 wt % nickel. In particular embodiments, the beryllium powder includes from about 92 wt % to less than 100 wt % beryllium and from greater than zero wt % to about 8 wt % nickel. Generally, it is contemplated that the coating forms the particles for grain refinement.

In one embodiment, the beryllium powder may have at least a portion of the stabilizers bound to the surface of the beryllium powder.

The stabilizers may be combined with beryllium in effective amounts to stabilize the precipitated the β-phase of beryllium after cycling through the heating and cooling. In one embodiment, the amount of stabilizers combined with the beryllium may be from 5 to 60% by weight, based on the total weight of the pre-alloy composition. More preferably, the stabilizers may be present in an amount from 5 to 40% by weight, e.g., 10 to 35% by weight, 10 to 25% by weight or from 15 to 20% by weight.

In one embodiment, the stabilizer is cobalt that may be combined with beryllium in an effective amount to precipitate β-phase of beryllium. Cobalt may be effective in stabilizing the precipitated β-phase of beryllium and may be effective in grain refinement to produce an article that has improved strength and performance. In one embodiment, cobalt may be present as a stabilizer in the pre-alloy composition in amounts from 15 to 25% by weight, based on the total weight of the pre-alloy composition. More preferably, the cobalt may be present in an amount from 15 to 23% by weight, e.g., from 17 to 22% by weight or from 18 to 20% by weight.

In one embodiment, the stabilizer is copper that may be combined with beryllium in an effective amount to precipitate β-phase of beryllium. Copper may be effective in stabilizing the precipitated β-phase of beryllium and may be effective in grain refinement to produce an article that has improved strength and performance. In one embodiment, copper may be present as a stabilizer in the pre-alloy composition in amounts from 40 to 60% by weight, based on the total weight of the pre-alloy composition. More preferably, the copper may be present in an amount from 45 to 60% by weight, e.g., from 45 to 55% by weight or from 45 to 50% by weight.

In one embodiment, the stabilizer is nickel that may be combined with beryllium in an effective amount to precipitate β-phase of beryllium. Nickel may be effective in stabilizing the precipitated β-phase of beryllium and may be effective in grain refinement to produce an article that has improved strength and performance. In one embodiment, nickel may be present as a stabilizer in the pre-alloy composition in amounts from 25 to 35% by weight, based on the total weight of the pre-alloy composition. More preferably, the nickel may be present in an amount from 27 to 35% by weight, e.g., from 27 to 33% by weight or from 27 to 30% by weight.

In one embodiment, the stabilizer is iron that may be combined with beryllium in an effective amount to precipitate β-phase of beryllium. Iron may be effective in stabilizing the precipitated β-phase of beryllium and may be effective in grain refinement to produce an article that has improved strength and performance. In one embodiment, iron may be present as a stabilizer in the pre-alloy composition in amounts from 5 to 15% by weight, based on the total weight of the pre-alloy composition. More preferably, the iron may be present in an amount from 7 to 15% by weight, e.g., from 7 to 12% by weight or from 7 to 10% by weight.

The stabilization of the beta phase may also be combined with nucleants for grain refinement. In one embodiment, the pre-alloy composition may comprise an intermetallic compound of beryllium that functions as a nucleant. In one embodiment, the intermetallic compound of beryllium is a beryllide such as beryllium titanium ($Be_{12}Ti$, $Be_2Ti$), beryllium chromium ($Be_2Cr$ or $Be_{12}Cr$), iron beryllium ($FeBe_5$), beryllium zirconium ($Be_{13}Zr$, $Be_5Zr$, $Zr_2Be_{17}$), tantalum beryllide ($TaBe_2$, $Ta_2Be_{17}$, $TaBe_{12}$ or $TaBe_{17}$), beryllium molybdenum ($Be_2Mo$, $Be_{12}Mo$, $Be_{22}Mo$), niobium beryllium ($NbBe_2$, $NbBe_3$, $Nb_2Be_{17}$, $NbBe_{12}$), beryllium tungsten ($Be_{22}W$), beryllium strontium ($Be_{13}Sr$), and/or beryllium hafnium ($Be_5Hf$). Once the particles are formed the energy of nucleation of the beryllium is lowered to achieve grain refinement. Without limitation, the nucleants may be present in an amount from 0 to 40% by weight based on the total weight of the pre-alloy composition, e.g., from 0 to 35% by weight, from 0 to 30% by weight, from 0.5 to 35% by weight, from 1 to 30% by weight, or from 1 to 20% by weight.

In one embodiment, the pre-alloy composition may be in the form of particles, such as a powder. The particles have a D50 average size from 10 to 50 microns, e.g., from 15 to 50 microns, from 20 to 45 microns, or from 25 to 40 microns. At least a portion of the stabilizers may be bound to the surface of the beryllium powder.

By cycling several layers of deposited pre-alloy composition a beryllium article may be formed. After cycling above a temperature that is greater than or equal to the beta transus temperature of the pre-alloy composition, the β-phase of the beryllium may be precipitated. Beryllium transitions from its alpha form to beta form at a temperature referred to as the beta transus, e.g., from 1050° C. to 1250° C. The stabilization of the β-phase of the beryllium is provided to achieve the desired grain refinement. In one embodiment, complex shapes may be formed from the articles having multiple layers. In one embodiments, the resulting shape may be geometric shape or a three-dimensional shape that is formed from multiple layers. In one embodiment, the method deposits an initial layer, preferably at a relatively high rate. In one embodiment, the initial layer may be uniformly deposited by depositing the pre-alloy composition on a surface of a substrate. In some embodiments, the initial layer may be deposited on a surface such as a substrate, platform, or base plate.

Figure 2:
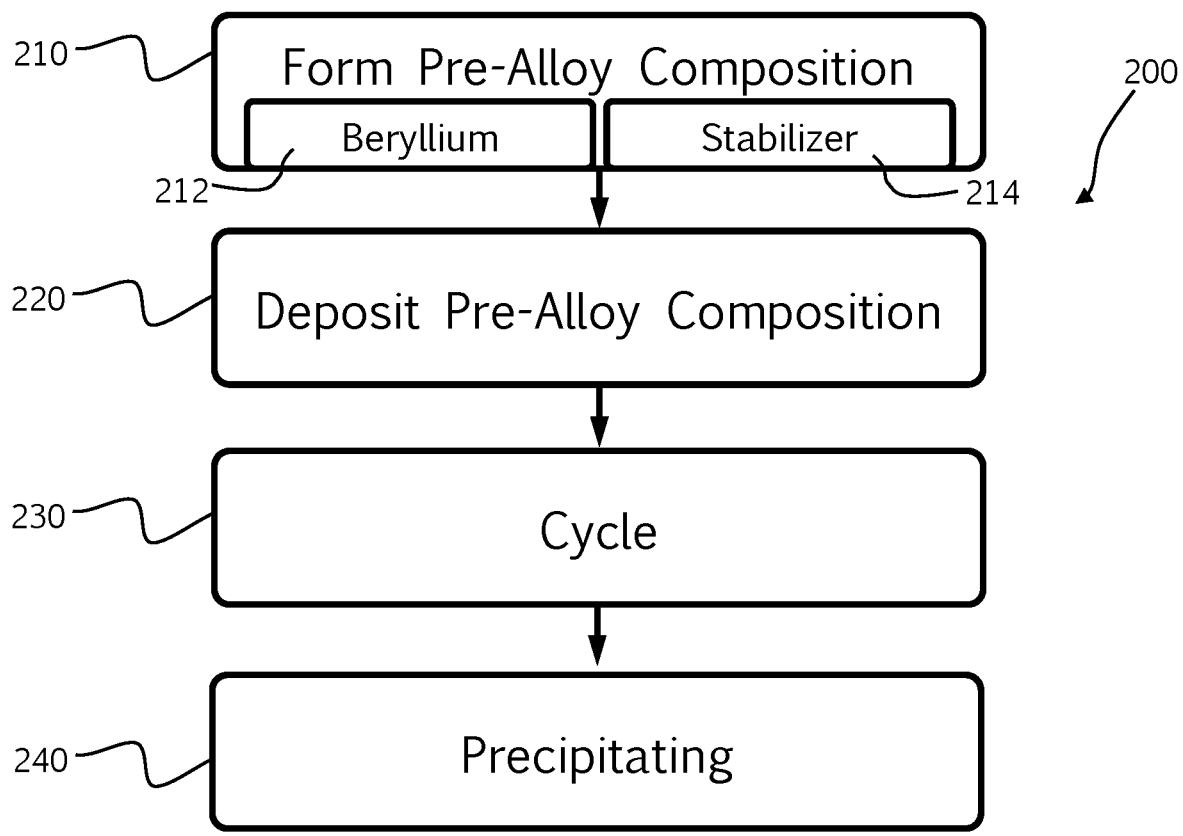
FIG. 2 is a flowchart for an exemplary method to form a beryllium article wherein each layer comprises a pre-alloy composition.

FIG. 2 is a flowchart of an exemplary method 200 of grain refining a beryllium-based article. In step 210, a pre-alloy composition is formed by combining beryllium 212 and at least one stabilizer 214. In one embodiment, the stabilizer 214 is a metal stabilizer which may be at least one metal selected from the group consisting of cobalt, copper, nickel, and iron. Step 210 may involve mixing, blending, atomization, mechanical alloying, resonant mixing, or combinations thereof to combine the beryllium 212 and at least one stabilizer 214.

In step 220, a layer comprising the pre-alloy composition is deposited on a surface. In step 230, the cycling process is initiated to cycle at least a portion of the deposited layer above a temperature that is greater than or equal to the beta transus temperature of the pre-alloy composition. The cycling step may include heating above a temperature that is greater than or equal to the beta transus temperature and cooling below a temperature that is less than or equal to the beta transus temperature. In step 240, a β-phase of the beryllium in the layer is precipitated. Steps 220-240 are repeated for each layer of the beryllium-based article. Steps 220-240 may be repeated depending on the number of layers of the beryllium-based article.

In one embodiment, the method may begin by depositing the initial layer in a build box. Preferably the pre-alloy composition is transferred to the build box with minimal loss or contamination of the surrounding area. The build box comprises a surface, e.g., build platform, and side walls. The build platform is generally a flat surface on which the successive layers are deposited. The build platform may move along a vertical z-axis based on signals provided from a computer-operated controller. The side walls cooperate with the build platform to form a "box" that contains the deposited pre-alloy composition. Generally, the side walls remain in a fixed location, and the build platform moves downward to permit the next layer of pre-alloy composition to be deposited.

The initial layer may be deposited in a pre-determined pattern on the surface. In some embodiments, the preset pattern is determined based on the layers of a computer-aided design (CAD) model. Any suitable technique to deposit the initial layer is suitable for the method including spreading, coating, brushing, rolling, spraying, or dispensing. In one embodiment, one or more deposition heads are used and are moved in horizontal x-y plane. A controller may be used to move the one or more deposition heads specified by the design. The horizontal x-y plane is a plane defined by an x-axis and a y-axis where the x-axis, the y-axis, and the z-axis are orthogonal to each other.

In some embodiments, the deposition occurs under an inert gas atmosphere. In one embodiment, the deposition may occur in a reducing atmosphere to reduce the formation of oxides. After the layer of beryllium and the stabilizers are deposited, energy may be applied in a reducing atmosphere. In one embodiment, the reducing atmosphere contains less than 20 vol % of oxygen, e.g., less than 15 vol. %, less than 10 vol. % or less than 5 vol. %.

In one embodiment, the each layer may be deposited in an even manner. The initial layer may have a thickness from 20 to 200 microns, e.g., from 25 to 150 microns, from 25 to 110 microns, from 30 to 100 microns, from 35 to 75 microns, or from 40 to 60 microns. In some embodiments, the layer may be formed by compacting the deposited materials in an optional compaction method. Compacting powders may be desired to provide thin layers using a mechanical compactor such as doctor blades or double rolling or electrostatic force. In some embodiments, the layers may be deposited Subsequent to the deposition of the initial layer, the process uses a cycling process to heat the initial layer above a temperature that is greater than or equal to the beta transus temperature of the pre-alloy composition and then subsequently cool the layer. In one embodiment, the cycling process may be rapid to increase productivity and efficiency. In one embodiment, the cycling further comprises exposing the deposited initial layer to an energy source. The cycling transitions through a thermal gradient at a high rate to solidify the beryllium article. In one embodiment, the energy source may be directed to at least a portion of the initial layer. The energy source may produce localized or focused energy to heat at least a portion of the initial layer, preferably to heat at least a portion of the initial layer. In one embodiment, the energy source may be sufficient to heat the layer above a temperature that is greater than or equal to beta transus temperature of the pre-alloy composition. The energy source may be an electron beam or laser beam having a power density from $10^3$ W/mm$^2$ to $10^7$ W/mm$^2$, e.g., from $10^4$ W/mm$^2$ to $10^7$ W/mm$^2$, or from $10^5$ W/mm$^2$ to $10^6$ W/mm$^2$. Operating the energy source at a power of less than $10^7$ W/mm$^2$ is sufficient to initiate heat above a temperature that is greater than or equal to the beta transus temperature of the pre-alloy composition. In one embodiment, the effective diameter of the energy source may be from 10 to 200 microns, e.g., from 25 to 150 microns, or from 35 to 100 microns. The scanning speed of the energy source may be 10 mm/s to 2000 mm/s, e.g., from 50 mm/s to 1500 mm/s or from 100 mm/s to 1000 mm/s. The raster width of the energy source may be from 50 to 500 microns, e.g., from 75 to 450 microns, from 75 to 400 microns, or from 100 to 350 microns. In one embodiment, the layer thickness may be from 20 microns to 200 microns, e.g., from 25 microns to 175 microns or from 50 microns to 150 microns.

In one embodiment, the energy source and/or another source heats the initial layer to a temperature above the beta transus temperature. In one embodiment, the beta transus temperature may be from 1050° C. to 1250° C., e.g. from 1075° C. to 1225° C., from 1100° C. to 1200° C., or from 1100° C. to 1175° C. In one embodiment, the cycling process may be rapid to limits the exposure of the pre-alloy composition to temperatures above the beta transus temperature to less than 300 seconds, e.g., less than 240 seconds, less than 180 seconds, less than 120 seconds, less than 90 seconds, less than 60 seconds, less than 50 seconds, less than 45 seconds, less than 30 seconds, less than 25 second, less than 20 seconds, less than 10 second, less than 5 second, less than 1 second, or less than 0.5 second. In terms of ranges, in one embodiment, the rapid cycling may be from 0.01 to 300 seconds, e.g., from 0.01 to 240 seconds, from 0.1 to 180 seconds, from 0.2 to 120 seconds, from 0.2 to 90 seconds, from 0.25 to 60 seconds, from 0.5 to 60 seconds, from 0.5 to 30 seconds, from 0.5 to 15 seconds, or from 0.5 to 10 seconds. Extended exposure above the beta transus temperature may lead to decomposition of the β-phase and formation of lamellar microstructures.

Unless pre-heating is used, the initial layer may be deposited at room temperature (20 to 25° C.). In some embodiments, the deposited initial may be pre-heated in the build box to a temperature of at least 100° C., e.g., at least 120° C., or 150° C., at least 200° C., at least 400° C., at least 450° C., or at least 500° C.

Operating the method under a reduced atmospheric pressure or under vacuum may provide quality control for the layers and beryllium article material. Nonetheless, in some embodiments, the method may be operated under atmospheric pressure.

As part of the cycling process, the process also cools the deposited layer. In one embodiment, minimum cooling rates may be greater than 10° C./min, e.g., greater than 15° C./min or greater than 20° C./min. In some embodiments, the cooling rates may be greater than 1000° C./min, e.g., greater than 10,000° C./min, to achieve solidification. The cooling or undercooling may be achieved at a cooling rate from 10° C./min to 10,000° C./min, e.g., from 20° C./min to 5,000° C./min, from 50° C./min to 3,000° C./min or from 100° C./min to 1000° C./min. In one embodiment, the cooling may be in the building direction of the layers. During the solidification, the β-phase of the beryllium may be precipitated. The β-phase of the beryllium is stabilized by the presence of the stabilizer and the β-phase of the beryllium contributes to grain refinement.

A coolant may be used to achieved the desired cooling by removing excess energy applied to the layer. The coolant may further reduce temperature gradients in the layers that tend to form columnar grains and thus improves the grain refinement. In one embodiment, the coolant may be an inert gas such a nitrogen or a noble gas, in particular argon. The coolant may be a mix a gases. The coolant may be delivered to the layer as a focused gaseous stream at a temperature of less than or equal to 100° C., e.g., less than or equal to 75° C., less than or equal to 50° C., less than or equal to 25° C., less than or equal to 0° C., less than or equal to −10° C., less than or equal to −25° C. or less than or equal to −50° C. In terms of ranges the coolant may be applied at a temperature from −200° C. to 100° C., e.g., from −150° C. to 50° C. or from −100° C. to 25° C., including subranges therein. The flow of the coolant may be adjusted as the layers are deposited and the flow rate may be less than 500 L/min, e.g., less than 250 L/min or less than 100 L/min.

The thermal conditions of the article may be monitored using infrared temperature sensors, thermocouples, resistance temperature detectors, thermistors, or other suitable temperature sensor. The sensors may monitor the temperature in the region where the energy and/or coolant is applied.

In response to the temperature, the process may adjust the cooling rate by adjusting the flow rate, duration or temperature of the coolant.

The process may be repeated for one or more successive layers in a similar manner, and thus cycling each layer of deposited pre-alloy composition and precipitating the β-phase of the beryllium in the layer. After allowing a sufficient time for precipitation, one or more successive layers may be deposited in a pre-determined pattern on at least a portion of the initial layer opposite of the surface. This continues to build the beryllium article where each of the successive layers are deposited on at least a portion of the previously deposited layer. In one embodiment, the successive layers are deposited to achieve a complex shape, such as a three-dimensional shape. The successive layers may be deposited at room temperature or may be pre-heated similarly to the initial layer. In a similar manner, an energy source is directed to at least a portion of the successive layer for cycling above a temperature that is greater than or equal to the beta transus temperature of the pre-alloy composition. In one embodiment, the energy source is controlled within similar operating parameters as the initial layer. Depending on the article, the pattern for each successive layer may be different. In some embodiments, the successive layer(s) may be deposited on at least a portion of the prior or initial layers.

In some embodiments, the surface or build plate may be lowered by the thickness of the next successive layer. The thickness of the successive layers may vary and in one embodiment, the successive layer may have a thickness from 20 to 200 microns, e.g., from 25 to 150 microns, from 25 to 110 microns, from 30 to 100 microns, from 35 to 75 microns, or from 40 to 60 microns. In some embodiments, each successive layer may have a similar thickness or the thickness may accommodate the beryllium article. The method may continue with repeated deposition, cycling and precipitation until the desired beryllium article is formed. In one embodiment a three-dimensional object is formed. In one embodiment, the beryllium article may be formed by one or more successive layers, e.g., at least 5 successive layers, at least 10 successive layers, or at least 20 successive layers. For some articles, several hundred layers may be used and thus the number of layers are not limited. The method may be repeated for each successive layer.

Each of the successive layers may comprise the pre-alloy composition to provide stabilizers for each layer. In one embodiment, a portion of the layers may comprise stabilizers that are useful for stabilizing the β-phase of the beryllium across layers.

The orientation of the microstructure is not limited to the build direction of the successive layers. The microstructure of the beryllium article may contain a plurality of dendrite layers having differing primary growth-direction angles with respect to each other. This provides for a beryllium article that is crack-free.

In some embodiments, the methods further include curing the plurality of layers prior to sintering the preform. In one embodiment, the beryllium article may be solutionized followed by a quench. The beryllium article may be annealed for a period from 6 to 12 hours, e.g., from 8 to 10 hours. The quenching rate may be greater than 25° C./min, e.g., greater than 50° C./min or greater than 100° C./min. The quenching may be done slowly at room temperature. The annealed article can be finished, for example by polishing or plating. The surface roughness of the article may be reduced, for example, via bead blasting or barrel finishing. In some embodiments, the manufactured beryllium article may have loose or unfused particles in one or more of the layers. The unfused particles may be removed by blowing or vacuuming as needed.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

As used below, any reference to a series of embodiments is to be understood as a reference to each of those embodiments disjunctively (e.g., "Embodiments 1-4" is to be understood as "Embodiments 1, 2, 3, or 4").

Embodiment 1 is a method of grain refining a beryllium-based article, the method comprising combining beryllium and at least one stabilizer to form a pre-alloy composition; depositing a layer comprising the pre-alloy composition on a surface; cycling at least a portion of the layer above a temperature that is greater than or equal to the beta transus temperature of the pre-alloy composition; precipitating a β-phase of the beryllium in the layer; and repeating the depositing/cycling/precipitating for one or more successive layers, wherein each of the successive layers comprises the pre-alloy composition.

Embodiment 2 is an embodiment of embodiment 1, wherein the at least one stabilizer comprising at least one metal being selected from the group consisting of cobalt, copper, nickel, and iron.

Embodiment 3 is an embodiment of any one of embodiments 1 or 2, wherein the beryllium-based article has an average grain size from 1 to 80 microns.

Embodiment 4 is an embodiment of any one of embodiments 1-3, wherein the beryllium-based article comprises from 1 at. % to 99 at. % of β-phase species, based on the total beryllium in the beryllium-based article.

Embodiment 5 is an embodiment of any one of embodiments 1-3, wherein the beryllium-based article comprises from 10 at. % to 60 at. % of β-phase species, based on the total beryllium in the beryllium-based article.

Embodiment 6 is an embodiment of any one of embodiments 1-5, wherein the combining of beryllium and the at least one stabilizer is done by mixing, blending, atomization, mechanical alloying, resonant mixing, or combinations thereof.

Embodiment 7 is an embodiment of any one of embodiments 1-6, wherein the pre-alloy composition comprises from 40 to 95% by weight of beryllium.

Embodiment 8 is an embodiment of any one of embodiments 1-7, wherein the pre-alloy composition comprises from 5 to 60% by weight of the at least one stabilizer.

Embodiment 9 is an embodiment of any one of embodiments 1-8, wherein the at least one stabilizer is cobalt and the pre-alloy composition comprises from 15 to 25% by weight of cobalt.

Embodiment 10 is an embodiment of any one of embodiments 1-8, wherein the at least one stabilizer is copper and the pre-alloy composition comprises from 40 to 60% by weight of copper.

Embodiment 11 is an embodiment of any one of embodiments 1-8, wherein the at least one stabilizer is nickel and the pre-alloy composition comprises from 25 to 35% by weight of nickel.

Embodiment 12 is an embodiment of any one of embodiments 1-8, wherein the at least one stabilizer is iron and the pre-alloy composition comprises from 5 to 15% by weight of iron.

Embodiment 13 is an embodiment of any one of embodiments 1-12, wherein the cycling further comprises exposing the deposited layer to an energy source.

Embodiment 14 is an embodiment of any one of embodiments 1-13, wherein the cycling further comprises cooling.

Embodiment 15 is an embodiment of any one of embodiments 1-14, wherein the average grain size is from 5 to 25 microns.

Embodiment 16 is an embodiment of any one of embodiments 1-15, wherein the pre-alloy composition is in the form of particles.

Embodiment 17 is an embodiment of embodiment 16, wherein the particles have a D50 average size from 10 to 50 microns.

Embodiment 18 is an embodiment of any one of embodiments 1-17, wherein each of the successive layers are deposited on at least a portion of the previously deposited layer.

Embodiment 19 is an embodiment of any one of embodiments 1-18, wherein the beta transus temperature is from 1050° C. to 1250° C.

Embodiment 20 is an embodiment of any one of embodiments 1-19, wherein the beryllium-based article comprises beryllium; and at least one stabilizer comprising at least one metal being selected from the group consisting of cobalt, copper, nickel, and iron, wherein the beryllium-based article has an average grain size from 1 to 80 microns, and wherein the beryllium-based article comprises from 1 at. % to 99 at. % of β-phase species based on the total beryllium in the beryllium-based article.

Embodiment 20 is a method of grain refining a beryllium-based article, the method comprising depositing a layer on a surface, the layer comprising a pre-alloy composition comprising beryllium and at least one stabilizer comprising at least one metal being selected from the group consisting of cobalt, copper, nickel, and iron; cycling at least a portion of the layer above a temperature that is greater than or equal to the beta transus temperature of the pre-alloy composition; precipitating a β-phase of the beryllium in the layer; and repeating the depositing/cycling/precipitating for one or more successive layers, wherein each of the successive layers comprises the pre-alloy composition and wherein the beryllium-based article has an average grain size from 1 to 80 microns.

Embodiment 21 is an embodiment of embodiment 20, wherein the beryllium-based article comprises from 1 at. % to 99 at. % of β-phase species, based on the total beryllium in the beryllium-based article.

Embodiment 22 is an embodiment of any one of embodiments 20 or 21, further comprising combining beryllium and the at least one stabilizer to form the pre-alloy composition.

Embodiment 23 is an embodiment of any one of embodiments 20-22, wherein the combining of beryllium and the at least one stabilizer is done by mixing, blending, atomization, mechanical alloying, resonant mixing, or combinations thereof.

Embodiment 24 is an embodiment of any one of embodiments 20-23, wherein the pre-alloy composition comprises from 40 to 95% by weight of beryllium.

Embodiment 25 is an embodiment of any one of embodiments 20-24, wherein the pre-alloy composition comprises from 5 to 60% by weight of the at least one stabilizer.

Embodiment 26 is an embodiment of any one of embodiments 20-25, wherein the at least one stabilizer is cobalt and the pre-alloy composition comprises from 15 to 25% by weight of cobalt.

Embodiment 27 is an embodiment of any one of embodiments 20-26, wherein the at least one stabilizer is copper and the pre-alloy composition comprises from 40 to 60% by weight of copper.

Embodiment 28 is an embodiment of any one of embodiments 20-27, wherein the at least one stabilizer is nickel and the pre-alloy composition comprises from 25 to 35% by weight of nickel.

Embodiment 29 is an embodiment of any one of embodiments 20-28, wherein the at least one stabilizer is iron and the pre-alloy composition comprises from 5 to 15% by weight of iron.

Embodiment 30 is an embodiment of any one of embodiments 20-29, wherein the cycling further comprises exposing the deposited layer to an energy source.

Embodiment 31 is an embodiment of any one of embodiments 20-30, wherein the cycling further comprises cooling.

Embodiment 32 is an embodiment of any one of embodiments 20-31, wherein the average grain size is from 5 to 25 microns.

Embodiment 33 is an embodiment of any one of embodiments 20-32, wherein the pre-alloy composition is in the form of particles.

Embodiment 34 is an embodiment of embodiment 30, wherein the particles have a D50 average size from 10 to 50 microns.

Embodiment 35 is an embodiment of any one of embodiments 20-34, wherein each of the successive layers are deposited on at least a portion of the previously deposited layer.

Embodiment 36 is an embodiment of any one of embodiments 20-35, wherein the beta transus temperature is from 1050° C. to 1250° C.

Embodiment 37 is beryllium-based article comprising beryllium; and at least one stabilizer comprising at least one metal being selected from the group consisting of cobalt, copper, nickel, and iron, wherein the beryllium-based article has an average grain size from 1 to 80 microns, and wherein the beryllium-based article comprises from 1 at. % to 99 at. % of β-phase species based on the total beryllium in the beryllium-based article.

Embodiment 38 is an embodiment of 37, comprising from 40 to 95% by weight of beryllium.

Embodiment 39 is an embodiment of any one of embodiments 37 or 38, comprising from 5 to 60% by weight of the at least one stabilizer.

Embodiment 40 is an embodiment of any one of embodiments 37-39, wherein the at least one stabilizer is cobalt and the pre-alloy composition comprises from 15 to 25% by weight of cobalt.

Embodiment 41 is an embodiment of any one of embodiments 37-40, wherein the at least one stabilizer is copper and the pre-alloy composition comprises from 40 to 60% by weight of copper.

Embodiment 42 is an embodiment of any one of embodiments 37-41, wherein the at least one stabilizer is nickel and the pre-alloy composition comprises from 25 to 35% by weight of nickel.

Embodiment 43 is an embodiment of any one of embodiments 37-42, wherein the at least one stabilizer is iron and the pre-alloy composition comprises from 5 to 15% by weight of iron.

Embodiment 44 is an embodiment of any one of embodiments 37-43, wherein the average grain size is from 5 to 25 microns.

Embodiment 45 is an embodiment of any one of embodiments 37-44, wherein the beryllium-based article comprises a beryllide.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the invention and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit.

I claim:

1. A method of grain refining a beryllium-based article, the method comprising:
   combining beryllium and at least one stabilizer comprising at least one metal being selected from the group consisting of cobalt, copper, nickel, and iron to form a pre-alloy composition;
   depositing a layer comprising the pre-alloy composition on a surface;
   cycling at least a portion of the layer above a temperature that is greater than or equal to the beta transus temperature of the pre-alloy composition;
   precipitating a $\beta$-phase of the beryllium in the layer; and
   repeating the depositing/cycling/precipitating for one or more successive layers, wherein each of the successive layers comprises the pre-alloy composition and wherein the beryllium-based article has an average grain size from 1 to 80 microns.

2. The method of claim 1, wherein the beryllium-based article comprises from 1 at. % to 99 at. % of $\beta$-phase species, based on the total beryllium in the beryllium-based article.

3. The method of claim 1, wherein the combining of beryllium and the at least one stabilizer is done by mixing, blending, atomization, mechanical alloying, resonant mixing, or combinations thereof.

4. The method of claim 1, wherein the pre-alloy composition comprises from 40 to 95% by weight of beryllium and from 5 to 60% by weight of the at least one stabilizer.

5. The method of claim 1, wherein:
   the at least one stabilizer is cobalt and the pre-alloy composition comprises from 15 to 25% by weight of cobalt;
   the at least one stabilizer is copper and the pre-alloy composition comprises from 40 to 60% by weight of copper;
   the at least one stabilizer is nickel and the pre-alloy composition comprises from 25 to 35% by weight of nickel; or
   the at least one stabilizer is iron and the pre-alloy composition comprises from 5 to 15% by weight of iron.

6. The method of claim 1, wherein the cycling further comprises exposing the deposited layer to an energy source.

7. The method of claim 1, wherein the cycling further comprises cooling.

8. The method of claim 1, wherein the average grain size is from 5 to 25 microns.

9. The method of claim 1, wherein the pre-alloy composition is in the form of particles.

10. The method of claim 9, wherein the particles have a D50 average size from 10 to 50 microns.

11. The method of claim 1, wherein each of the successive layers are deposited on at least a portion of the previously deposited layer.

12. The method of claim 1, wherein the beta transus temperature is from 1050° C. to 1250° C.

13. The method of claim 1, wherein the beryllium-based article comprises beryllium; and
   at least one stabilizer comprising at least one metal being selected from the group consisting of cobalt, copper, nickel, and iron,
   wherein the beryllium-based article has an average grain size from 1 to 80 microns, and
   wherein the beryllium-based article comprises from 1 at. % to 99 at. % of $\beta$-phase species based on the total beryllium in the beryllium-based article.

14. A method of grain refining a beryllium-based article, the method comprising:
   depositing a layer on a surface, the layer comprising a pre-alloy composition comprising beryllium and at least one stabilizer comprising at least one metal being selected from the group consisting of cobalt, copper, nickel, and iron;
   cycling at least a portion of the layer above a temperature that is greater than or equal to the beta transus temperature of the pre-alloy composition;
   precipitating a $\beta$-phase of the beryllium in the layer; and
   repeating the depositing/cycling/precipitating for one or more successive layers, wherein each of the successive layers comprises the pre-alloy composition and wherein the beryllium-based article has an average grain size from 1 to 80 microns.

15. The method of claim 14, wherein the beryllium-based article comprises from 1 at. % to 99 at. % of $\beta$-phase species, based on the total beryllium in the beryllium-based article.

16. The method of claim 14, wherein the cycling further comprises exposing the deposited layer to an energy source.

17. The method of claim 14, wherein the beta transus temperature is from 1050° C. to 1250° C.

18. A beryllium-based article comprising:
   beryllium; and
   at least one stabilizer comprising at least one metal being selected from the group consisting of cobalt, copper, nickel, and iron,
   wherein the beryllium-based article has an average grain size from 1 to 80 microns, and
   wherein the beryllium-based article comprises from 1 at. % to 99 at. % of $\beta$-phase species based on the total beryllium in the beryllium-based article, wherein the beryllium-based article is produced by:
      combining beryllium and at least one stabilizer comprising at least one metal being selected from the group consisting of cobalt, copper, nickel, and iron to form a pre-alloy composition;
      depositing a layer comprising the pre-alloy composition on a surface;
      cycling at least a portion of the layer above a temperature that is greater than or equal to the beta transus temperature of the pre-alloy composition;
      precipitating a $\beta$-phase of the beryllium in the layer; and
      repeating the depositing/cycling/precipitating for one or more successive layers.

19. The beryllium-based article of 18, comprising from 40 to 95% by weight of beryllium.

20. The beryllium-based article of 18, comprising from 5 to 60% by weight of the at least one stabilizer.

* * * * *